US006804253B2

United States Patent
Western (10) Patent No.: US 6,804,253 B2
(45) Date of Patent: Oct. 12, 2004

(54) METHOD FOR DETERMINING MOBILE STATION CODING SCHEME ADAPTATION CAPABILITY

(75) Inventor: Gary E. Western, Round Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 23 days.

(21) Appl. No.: 10/261,991

(22) Filed: Oct. 1, 2002

(65) Prior Publication Data

US 2004/0062269 A1 Apr. 1, 2004

(51) Int. Cl.[7] .................................................. H04J 3/22
(52) U.S. Cl. ......................................................... 370/465
(58) Field of Search ................................ 370/465, 470, 370/477, 313, 329, 341, 349; 455/68–69, 70, 432.1, 432.2, 450, 452.1–452.2, 17, 61, 59

(56) References Cited

U.S. PATENT DOCUMENTS

| 5,920,545 A | * | 7/1999 | Rasanen et al. ............. 370/232 |
| 6,256,487 B1 | * | 7/2001 | Bruhn ......................... 455/352 |
| 6,549,759 B2 | * | 4/2003 | Arviv et al. ................... 455/69 |
| 2003/0142694 A1 | * | 7/2003 | Takano ........................ 370/477 |
| 2003/0198312 A1 | * | 10/2003 | Budka et al. ................ 375/377 |

* cited by examiner

Primary Examiner—Chi Pham
Assistant Examiner—Thai Hoang
(74) Attorney, Agent, or Firm—Cardinal Law Group

(57) ABSTRACT

The invention provides a method for determining coding scheme adaptation capability of a mobile station. A packet uplink acknowledgement is sent to the mobile station and a data packet including a coding scheme indicator is received. A determination may be made on whether a coding scheme associated with the mobile station is adaptable and the coding scheme is modified based on the determination.

34 Claims, 6 Drawing Sheets

METHOD FOR DETERMINING MOBILE STATION CODING SCHEME ADAPTATION CAPABILITY

FIELD OF THE INVENTION

This invention relates generally to wireless networks employing dynamic link adaptation algorithms with selectable coding schemes. In particular, the invention relates to a method for determining coding scheme adaptation capability of mobile stations within a General Packet Radio Service (GPRS) network or other mobile telephony system using memory for data packet transmissions.

BACKGROUND OF THE INVENTION

With wireless networks employing General Packet Radio Service (GPRS), a mobile station may be directed by a base station to transmit data blocks using a coding scheme that the network determines will result in the highest data throughput with the fewest possible retransmissions. GPRS is an extension of circuit-switched networks and data transmission services that use packet radio transmissions to carry end user's packet data using protocols such as Internet Protocol (IP) or X.25 information from mobiles to the network and visa versa. GPRS is an extension to the circuit-switched Global System for Mobile communications (GSM), having four different coding schemes with data rates of 9.05, 13.4, 15.6 and 21.4 kilobit per second (code rates ½, ⅔, ¾ and 1).

GPRS-enabled networks send commands to a mobile station, such as a cell phone, an Internet-enabled mobile phone or a personal digital assistant, to transmit data blocks at what it determines to be an optimal coding scheme. The selected coding scheme may rapidly degrade, however, with changing radio conditions or geographical movements of the mobile device. The mobile unit may have limitations in its coding capabilities and its ability to adapt to updated coding scheme commands. With the move toward third-generation network standards, there are even more possible problems with high-performance networks that use aggressive and dynamic coding schemes. Mobile stations need to adapt their coding schemes rapidly, and the networks need to recognize certain mobile stations that are unable to adapt quickly to avoid undue overhead in requesting code scheme changes that cannot be accommodated.

Problems between networks using aggressive coding schemes and certain mobile devices may occur when the mobile device is unable to respond to a coding scheme command. The mobile device may receive a request to change the coding scheme. During the allowed response time, the mobile station may send data blocks using the current coding scheme, giving the mobile station a chance to empty its buffers of uplink data that has already been segmented. Alternatively, during the response period, the mobile device may transmit a special control block to the network stating there is no data ready for transmission. This null data block may be referred to as a packet uplink dummy controlled block, or simply a packet uplink dummy.

Current dynamic link adaptation methods monitor the quality of packet transfers and changing channel-coding schemes based on changing radio conditions. These methods may have difficulty with mobile stations that send null data control blocks. The network may try to continue changing coding schemes as the null blocks are being sent, with the result that little end-user data is transferred and throughput is significantly reduced. Unfortunately, the more dynamic the link adaptation method is, the lower the throughput may be for an older or less provisioned mobile station. As technologies and protocols emerge and evolve for wireless data transmissions, additional coding schemes become available. For example, GSM networks incorporating Enhanced Data for Global Evolution (EDGE) with packet-switched enhancements for GPRS have nine additional coding schemes for increased performance. Other wireless network technologies such as GSM/EDGE Radio Access Network (GERAN) and Universal Mobile Telecommunications System (UMTS) provide enhanced coding schemes, requiring network algorithms that can determine the coding scheme adaptability of the mobile station and direct coding scheme commands to the mobile station based on the adaptability.

A desirable dynamic link adaptation method would be able to determine the coding capabilities of a mobile station and adapt its coding scheme to that device. The method would be able to detect, for example, when a mobile station is sending packet uplink dummies or null data blocks, and then use this information to determine future channel coding messages.

It is an object of this invention, therefore, to provide a method and system for determining coding scheme adaptation capability of wireless data devices, and to overcome the deficiencies and obstacles described above.

SUMMARY OF THE INVENTION

One aspect of the invention provides a method and system for determining coding scheme adaptation capability of a mobile station. A packet uplink acknowledgement is sent to the mobile station and a data packet including a coding scheme indicator is received. A determination is made on whether a coding scheme associated with the mobile station is adaptable and the coding scheme is modified based on that determination.

The determination may include comparing the coding scheme indicator of the received data packet to a coding scheme command. It may also include determining whether a received data packet is a null data packet. Based on that determination, the modification of the coding scheme may comprise altering the coding scheme command when the mobile station is adaptable.

A subsequent packet uplink acknowledgement including an altered coding scheme command may be sent when the mobile station is adaptable. Or, a subsequent packet uplink acknowledgement including an unaltered coding scheme command may be sent when the mobile station is not adaptable. Or, a subsequent packet uplink acknowledgement including an unaltered coding scheme command may be sent when the received data packet is a null data packet.

A coding scheme adaptation flag associated with the mobile station may be set and the coding scheme may be modified based on the coding scheme adaptation flag. A value of a coding performance parameter may be determined and the coding scheme may be modified based on the value of the coding performance parameter. Another aspect of the invention includes a computer usable medium with a program for determining coding scheme adaptation capability of a mobile station.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

The present invention is illustrated by the accompanying drawings of various embodiments and the detailed description given below. The drawings should not be taken to limit the invention to the specific embodiments, but are for explanation and understanding. The foregoing aspects and other attendant advantages of the present invention will become more readily appreciated by the detailed description taken in conjunction with the accompanying drawings, wherein.

DETAILED DESCRIPTION OF THE PRESENTLY PREFERRED EMBODIMENTS

The present invention provides a method for detecting mobile stations not supporting rapid coding scheme changes, to establish an appropriate coding scheme for each mobile station, and to maximize data packet throughput for all mobile stations connected to the network even when the mobile stations are less than optimal performers.

The method for determining coding scheme adaptation capability of a mobile station of the present invention maximizes data throughput for a mobile station connected within a GSM or GPRS network even when the mobile station is an older or lower-performing device. The invention helps insure that the throughput of data from a lower-performing mobile station is the highest possible.

It is anticipated that as third generation networking capacities supersede older two-generation (2G) or 2.5G network technologies, this invention will help the network to remain backward capable with older mobile stations and help optimize the performance of devices not employing the latest radio technologies and protocols. With this invention, throughput of these mobiles stations may be increased as much as 100 percent or more.

When the network sends the mobile station a command to change a channel coding scheme, the mobile station may behave in one of three ways. The mobile station may transmit data blocks using the new configuration. It may continue to transmit blocks using the old configuration before blocks with the new configuration are available. It may flush its lower layer buffers and rebuild blocks with the new configuration. With the latter action, a few number of packet uplink dummy control blocks may be transmitted before rebuilt blocks are available.

The code adaptation method of the present invention detects a mobile station that sends a null data packet or a packet uplink dummy control block following a coding scheme selection and then uses this information to determine future channel coding scheme changes.

A typical message sequence of an uplink packet transfer used in General Packet Radio Service (GPRS) coding schemes for mobile stations includes a packet uplink acknowledgement message. For example, a new coding scheme may be commanded in each packet uplink acknowledgement message when a mobile station is on the border between two regions or cells. The response time, as specified in the 3rd generation partnership project (3GPP) standards and other applicable standards, can be up to three block periods following the channel coding command. In GSM, a block period is 20 milliseconds, for example. This response time enables the mobile station to transmit the buffered data and resegment the remaining data with the new channel coding. The present invention detects and optimizes dynamic link adaptation algorithms.

With current coding scheme methods, data throughput is reduced when a mobile station chooses to send null data blocks or packet uplink dummy control blocks rather than sending the remaining data in the buffer. The method of the present invention determines when a channel coding scheme change command indicating a coding scheme different than the current coding scheme reaches the mobile station. If the mobile station sends back null data blocks or packet uplink dummy control blocks following the coding scheme command, a coding scheme adaptation flag may be set to indicate that rapid coding scheme changes are not optimal for the mobile station.

A coding performance parameter indicates how much throughput degradation the network is incurring due to coding scheme changes. The link adaptation algorithm then takes the coding performance parameter into account when making future coding scheme determinations. A coding scheme change to a higher coding scheme, one that provides less protection for user data, may be requested when it has been determined that the new coding scheme will likely be successful for at least a long enough period of time to satisfy throughput degradation that is due to the additional coding scheme commands and associated overhead.

The method allows the packet controller unit (PCU) of the network to provide the highest throughput possible to sub-optimal or lower-performing mobile stations that are unable to work well within more aggressive coding schemes.

Figure 1:
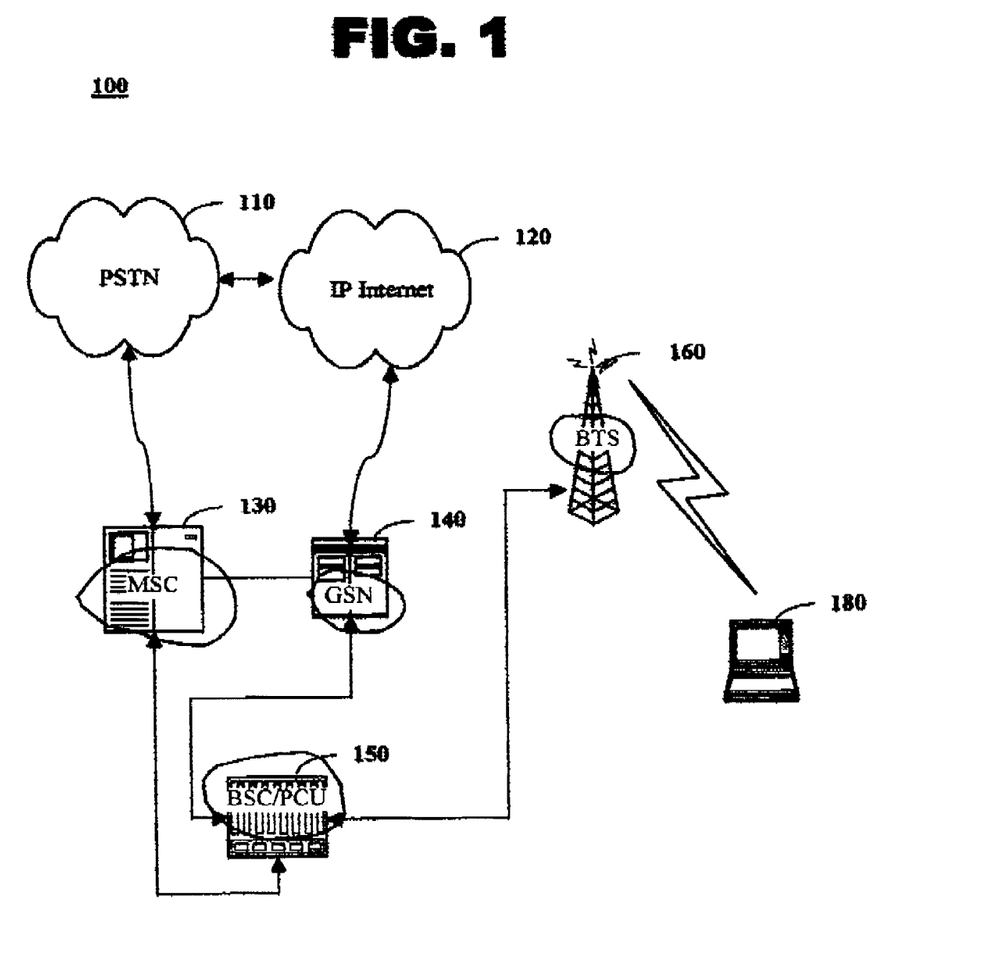
FIG. 1 is a schematic diagram of one embodiment of a system for determining coding scheme adaptation capability of a mobile station, in accordance with the current invention.

FIG. 1 shows a schematic diagram of one embodiment of a system for determining coding scheme adaptation capability of a mobile station, in accordance with the present invention at 100. Coding scheme adaptation determination system 100 includes one or more public-switched telephone networks (PSTN) 110, an Internet 120, one or more mobile switching centers (MSC) 130, one or more general packet radio service support nodes (GSN) 140, one or more base site controller and packet controller units (BSC/PCU) 150, one or more radio tower or base transceiver stations (BTS) 160, and one or more wireless data devices 180 such as a Internet-enabled cellular phone, a personal digital assistant or a laptop computer with wireless networking capabilities.

An exemplary network technology that may be used for network operations is Global System for Mobile (GSM) communications, a digital cellular standard used throughout the world. GSM data services include circuit-switched voice services, circuit-switched data, short message services (SMS), 2.5G and third-generation (3G) technologies that expand data-packet technologies and new multimedia types of wireless service. GSM uses three major frequency bands, including blocks of radio spectrum within the 900-, 1800-, and 1900-MHz bands. The 900- and 1800-MHz bands are the principal bands used in Europe and Asia, and the 1900-MHz band is used in North America.

With wireless networks employing General Packet Radio Service (GPRS), a mobile station is commanded to transmit data blocks at the optimal coding scheme that the network determines will result in the highest data throughput with the fewest possible retransmissions. For example, GPRS may offer transmissions via a GSM network within a range 9.6 kilobits to 115 kilobits and allow users to make telephone calls and transmit data at the same time, the latter using an IP data transmission protocol.

Another embodiment of the wireless network may include Enhanced Data for Global Evolution (EDGE), which is moving toward wideband code division multiple access (WCDMA). EDGE may be used as a packet-switched enhancement for general packet radio service (GPRS), known as enhanced GPRS or EGPRS, and as a circuit-switched data enhancement called enhanced circuit-switched data (ECSD).

Public-switched telephone network (PSTN) 110 is a land-based telephone network. PSTN 110 may comprise one or more switched lines over one or a combination of wire, fiber, or wireless links. PSTN 110 may be connected to Internet 120 and to MSC 130.

Internet 120 is a public data communication network, which may comprise one or more electronic, optical or wireless communication paths with associated hardware and software to connect PSTN 110 with one or more wireless data devices 180.

Mobile switching center 130 may receive signals from and send signals to wireless data device 180 via a general packet radio service support node (GSN) 140, base site controller and packet controller units (BSC/PCU) 150, and BTS 160. MSC 130 may contain suitable hardware and software for ensuring that transmissions between wireless data device 180 and BTS 160 are accurate and reliable. Accurate and reliable transmission of data packets may require that certain data packets be retransmitted, or encoded in a manner such that the data packet are decoded at the receiver without requiring an additional transmission of the data packet. MSC 130 may communicate with PSTN 110.

Mobile switching center 130 may be connected directly to Internet 120 via GSN 140 without requiring PSTN 110 as an intermediary. GSN 140 works with general packet radio service (GPRS), a packet-mode technique to transfer high-speed and low-speed data and to signal in an efficient manner over GSM radio networks. Strict separation between the radio subsystem and network subsystem is maintained, allowing the network subsystem to be reused with other radio access technologies.

GPRS may employ GSN 140 to keep track of the location of wireless data device 180 and to perform security functions and access control. GSN 140, which is at the same hierarchical level as MSC 130, may be connected to the system of BTS 160 with frame relay. GSN 140 provides interworking with external packet-switched networks such as Internet 120, and is connected with GSN 140 via the IP-based GPRS backbone network. GSN 140 can help MSC 130 with more efficient coordination of GPRS and non-GPRS services and functionality.

Base site controller and packet controller units (BSC/PCU) 150 may be connected to MSC 130, GSN 140 and BTS 160. Base site controller (BSC), as part of PSTN 110, and packet controller unit (PCU), as part of the subsystem of BTS 160, help control BTS 160 in call set-up functions, signaling and use of radio channels, and various maintenance tasks.

Base transceiver station (BTS) 160 contains suitable electronic equipment for transmitting and receiving radio frequency signals. BTS 160 may transmit and receive radio signals and more particularly, digitally encoded signals from wireless data device 180. Communications between BTS 160 and wireless data device 180 includes the transmission of data packets, which may be digitally encoded.

The data packets may be digitally encoded using a codable scheme (codes). The term scheme and code may be used interchangeably as appreciated by those skilled in the art. These schemes may be used in a variety of combinations with one or more received data packets. The transmission of data packets may use one or more modulation schemes, such as 16-QAM (quadrature amplitude modulation) or 8-PSK (phase shift keying). The modulation schemes and encoding schemes may be adaptively chosen based on factors such as requisite bit error rates (BER) or channel quality attributes.

A successful transmission of data packets may involve at least one additional transmission attempt (retransmission) of specific data packets whose contents were unsuccessfully decoded at the receiver. The retransmission may comprise a repeated transmission of the data packet that was corrupted in the channel. The retransmission may be sent at a lower data rate to improve the reliability of the data. The retransmission may also be sent at the same data rate, such as a repeated transmission. The retransmission may be sent at a higher data rate for faster data throughput. The data rate selection may be determined, for examples, with feedback from wireless data device 180, by a data rate selection of BTS 160, based on the current encoding scheme for a data packet, based on network throughput, or based on historical data for the mobile station.

Wireless data device 180, which may be a cellular phone, a laptop computer, a PDA or other wireless device, is equipped with suitable hardware and software for receiving and transmitting digital transmissions. Wireless data device 180 may send or receive data in a prescribed band of frequencies nominally at 900 MHz, 1900 MHz, or any suitable band of frequencies prescribed for wireless communication. Wireless data device 180 may be carried by a human user, installed on mobile equipment, or used in any application where wireless communication services are desired. Transmission of data may occur between wireless data device 180 and BTS 160.

Figure 2:
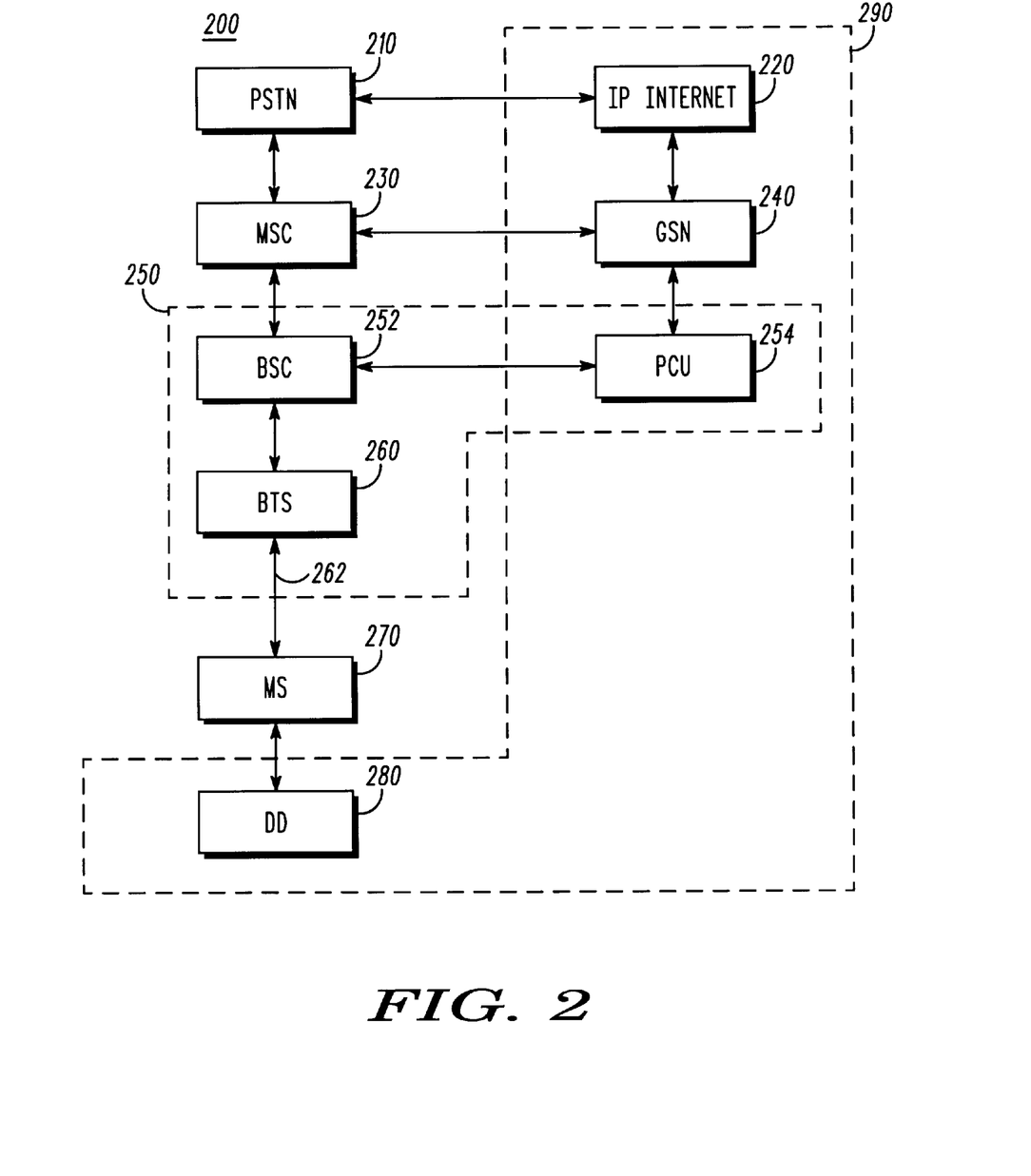
FIG. 2 is a block diagram of one embodiment of a system for determining coding scheme adaptation capability of a mobile station, in accordance with the current invention.

FIG. 2 is a block diagram of one embodiment of a system for determining coding scheme adaptation capability of a mobile station, in accordance with the present invention at 200. Components of mobile station code adaptation system 200 include a public-switched telephone network (PSTN) 210, a mobile switching center (MSC) 230, base station subsystem (BSS) 250, and packet radio-specific network 290.

Public switch telephone network (PSTN) 210, a land-based telephone network, may be connected to MSC 230. An Internet-protocol network 220 may be part of packet radio-specific network 290, along with the components of one or more GPRS support nodes (GSN) 240, one or more packet controller units (PCU) 254, and one or more wireless data devices 280.

GPRS support nodes (GSN) 240, as payload-carrying and control devices, help the network to switch packet data, routing packets to and from the geographical area of packet radio-specific network 290 and interfacing with Internet-protocol network 220. GSN 240 may be physically separate from the circuit-switched part of a cellular system core network. GSN 240 contains GPRS backbone network protocol (IP) routing functionality, and can be interconnected with IP routers.

Packet Controller Unit (PCU) 254 serves as an interface between BSS 250 and packet radio-specific network 290, performing radio functions and general packet radio service (GPRS) network functions. Besides PCU 254, base site or base station controller (BSC) 252 and base transceiver station (BTS) 260 are components of BSS 250. BSC 252 controls radio signals of multiple cell sites, thus reducing the load on MSC 230. BSC 252 also performs radio signal management functions for BTS 260, managing functions such as frequency assignment and handoff. BTS 260, which may be equipped with antenna and radio equipment, is the central radio transmitter/receiver that maintains communications with mobile station 270 within its cell site or given range.

Mobile station 270 consists of mobile equipment such as a cellular phone and is used to communicate with the GSM network. Mobile station 270 may be separate from or integrated with a wireless data device 280 such as a mobile personal digital assistant (PDA) or a wireless-capable laptop using over-the-air interface technologies such as those specified in IEEE 802.11. Mobile station 270 may connect to base transceiver station 260 via air interface 262, a standard operating system of a wireless network technologies including GSM.

Other network topologies besides the network architecture described above are possible without departing from the essential characteristics of the present invention. Additional components to separate various functions of a piece of equipment or module may be included with departing from the nature of the present invention.

Figure 3:
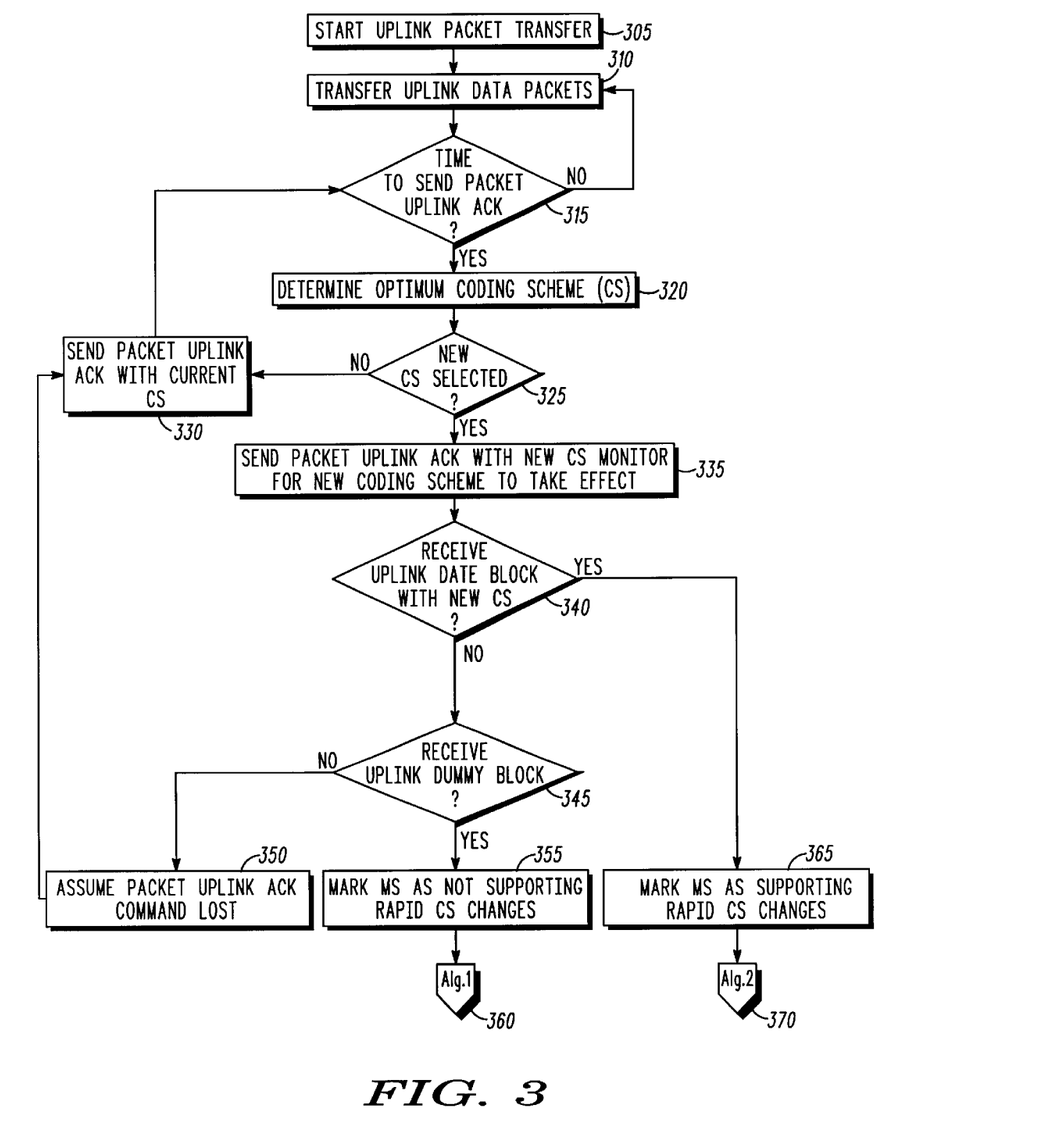
FIG. 3 is a flow chart of one embodiment of a method for determining coding scheme adaptation capability of a mobile station, in accordance with the current invention.

FIG. 3 shows a flow chart of one embodiment of a method for determining coding scheme adaptation capability of a mobile station, in accordance with the present invention at 300. The coding scheme adaptation capability method begins with the transfer of an uplink data packet from a mobile station to the packet-switched network, as seen at block 305.

As the mobile station sends up data packets, the network monitors the performance of the data transfer and periodically sends out commands to the mobile station to transmit data blocks at a new coding scheme so that throughput and data reliability are optimized. A typical communication sequence between the mobile station and the network is as follows: the mobile station uplinks data packets, and the network sends a command back to the mobile station to acknowledge receipt of the data packets indicating any packets that need to be resent. The packet uplink acknowledgement also may contain a coding scheme command to change its coding scheme. The mobile station acknowledges the new coding scheme after a defined response period, and the mobile station begins sending data with the new coding scheme if the mobile station is capable of accommodating the specified coding scheme. This transferring of uplink packets is an ongoing process, as seen at block 310.

The network monitors the data transfers and makes a determination when it is time to send packet uplink acknowledgement to the mobile station, as seen at block 315. Until then, the method continues to transfer uplink packets, as seen back at block 310.

When it is time to send a packet uplink acknowledgement, the network determines a coding scheme that the mobile station should use for future data transfers, as seen at block 320. The determination may be made based on the present radio situation such as bit error rates, block error statistics, and other measures of transfer performance. For example, when data transfers are occurring at low data rates with no errors, the network may choose a higher coding scheme that allows faster data transfer rates, though the scheme may be prone to higher bit errors. If many bit errors are occurring, a lower coding scheme may be requested to minimize the need to resend data packets and to provide easier decoding of sent packets. The selected coding scheme may be a step up or down from the current coding scheme, although in some cases a much faster or much slower data transfer rate may be selected.

A new coding scheme may or may not be selected, as seen at block 325. When the coding scheme remains unchanged, a packet uplink acknowledgement which contains the current coding scheme command may be sent to a mobile station, as seen at block 330. After a prescribed period of time or after a number of packet transfers, a subsequent packet uplink acknowledgement may be sent, as seen back at block 315.

When a new coding scheme is selected, as seen at block 325, the network sends the mobile station a packet uplink acknowledgement with the new coding scheme, as seen at block 335. Subsequently, the network monitors for the new coding scheme to take effect after a response time as defined by network specifications and protocols.

The network may or may not receive from the mobile station an uplink data block with the newly selected coding scheme within the specified period of time, as seen at block 340.

When the network receives back a data block without the new coding scheme, the network needs to determine whether the data block is an uplink dummy block, also known as a null data block, as seen at block 345. When the network does not receive an uplink data block with the new coding scheme, even after the allowed response time of the mobile station has passed, it may determine that the uplink data block is not a null data block and the network may assume that the packet uplink acknowledgement containing the new coding scheme was lost, as seen at block 350. The network proceeds to send another packet uplink acknowledgement with the new or revised coding scheme, as seen back at block 335.

Figure 4:
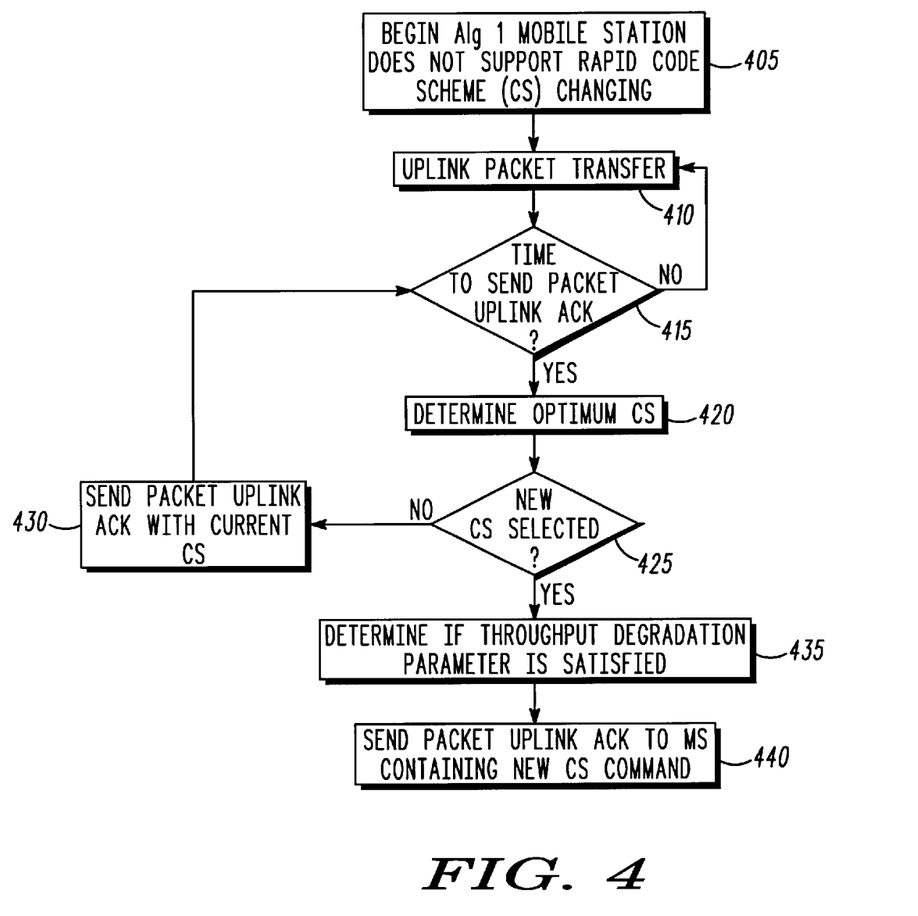
FIG. 4 is a flow chart of another embodiment of a method for determining coding scheme adaptation of a mobile station, in accordance with the current invention.

When an uplink null data block is received in response to a new coding scheme command, the network may mark the mobile station as not supporting rapid coding scheme changes or as not adaptable, as seen at block 355, and proceed to use an algorithm specified for inadaptable mobile stations or for mobile stations not supporting rapid scheme changes, as seen at block 360 and further described in FIG. 4.

In contrast, when the network receives an uplink data block with the new coding scheme, the network may mark the particular mobile station as supporting rapid coding scheme changes or as adaptable, as seen at block 365. The transfer of data packets continues according to an algorithm for rapid coding change capability, as seen at block 370 and further described in FIG. 5.

FIG. 4 is a flow chart of another embodiment of a method for coding scheme adaptation of a mobile station, in accordance with the present invention. Code adaptation method 400 may be used when a mobile station unable to support rapid scheme changes restricts coding scheme changes, or when a mobile station is not adaptable. A coding scheme adaptation flag associated with the mobile station may be set to indicate that the mobile station is not adaptable or that the mobile station does not support rapid scheme changes.

Code adaptation method 400 begins when the network determines that a mobile station does not support rapid coding scheme changes, as seen at block 405.

A mobile station uplinks a data packet to the packet-switched network, as seen at block 410. This transferring of data packets may be an ongoing process.

The network monitors data transfer and makes a determination when it is time to send a packet uplink acknowledgement to the mobile station, as seen at block 415. Until then, the method continues to transfer uplink packets, as seen back at block 410.

When the scheduled time for sending a periodic packet uplink acknowledgement has arrived, the method determines the optimum coding scheme that the mobile station should use for future data transfers, as seen at block 420. The determination may be made based on the present radio situation such as block error statistics and the constraints of the mobile station being unable to support rapid scheme changes. The determination may be based on the coding scheme adaptation flag associated with the mobile station, or the value of a throughput degradation parameter or coding performance parameter.

A new coding scheme may or may not be selected, as seen at block 425. When the coding scheme remains unchanged, a packet uplink acknowledgement containing the current coding scheme command may be sent to a mobile station, as seen at block 430. The method then waits again for the time to send a packet uplink acknowledgement, as seen back at block 415.

When a new coding scheme is selected, as seen at block 425, the network determines if the degradation throughput parameter is satisfied, as seen at block 435. When the degradation throughput parameter is satisfied, the network may send the mobile station a packet uplink acknowledgement containing a new coding scheme command, as seen at block 440. Subsequently, the network monitors for the new coding scheme to take effect during a reaction time as defined by network specifications and protocols. When the degradation parameter is not satisfied, the network may send the mobile station a packet uplink acknowledgement containing the current coding scheme command, as seen at block 430.

Alternatively, if the coding scheme adaptation flag associated with the mobile station is set to indicate that the mobile station is not adaptable or that the mobile station does not support rapid scheme changes, then a packet uplink acknowledgement with the current coding scheme may be sent, as seen at block 430.

The code adaptation method continues by beginning again at block 405, looping through the steps of blocks 405 through 440 until the mobile station is no longer sending data packets or is disconnected from the network.

Figure 5:
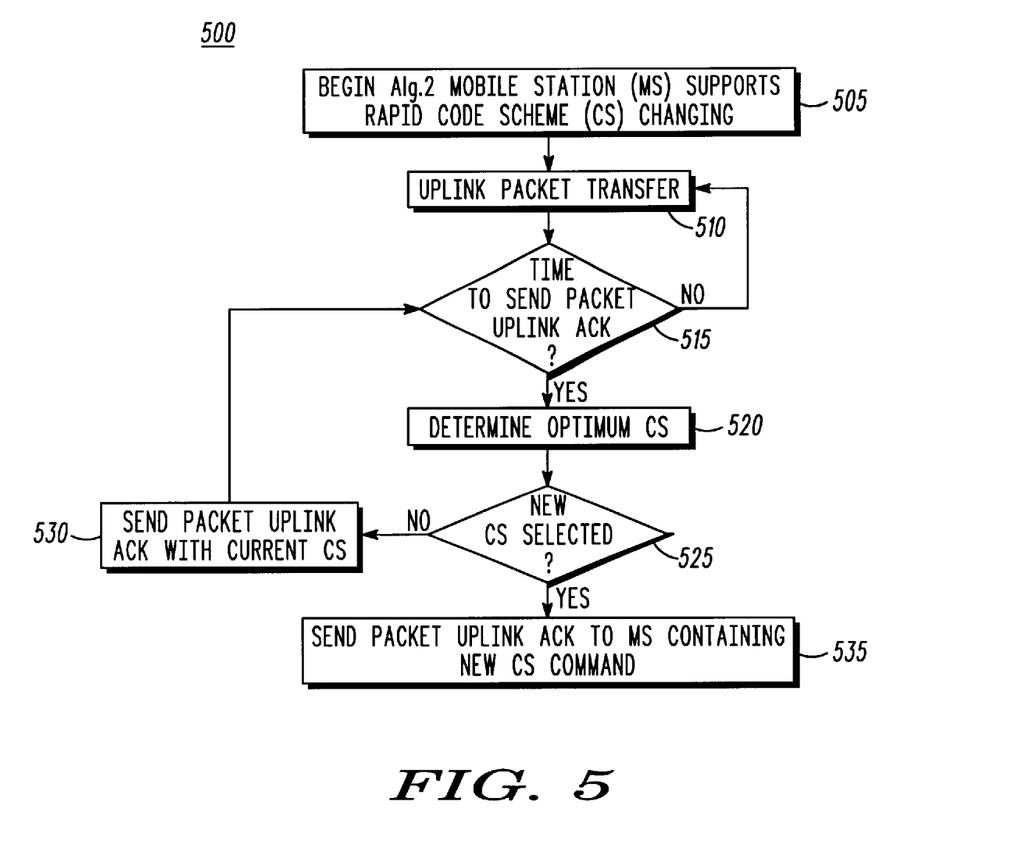
FIG. 5 is a flow chart of another embodiment of a method for determining coding scheme adaptation of a mobile station, in accordance with the current invention.

The embodiment of the method presented in FIG. 4 may be employed with mobile stations not supporting rapid scheme changes, whereas, the method presented with FIG. 5 may be used with mobile stations equipped to handle network requests for rapid coding changes.

FIG. 5 is a flow diagram of another embodiment of a method for determining coding scheme adaptation of a mobile station, in accordance with the present invention at 500. Like the embodiments described above, its aim is to maximize the throughput of the link between the mobile station and the wireless network. Code adaptation method 500 is potentially faster because the mobile station is able to respond to rapid coding scheme changes. The mobile station is able to change coding schemes at the end of each allowed response period if an updated coding scheme command is sent with the packet uplink acknowledgement.

Code adaptation method 500 begins at the point where the network determines that a mobile station may support rapid coding scheme changes, as seen at block 505.

A mobile station uplinks a data packet to the packet-switched network, as seen at block 510. This transferring of data packets may be an ongoing process.

The network monitors data transfers and makes a determination when it is time to send a packet uplink acknowledgement to the mobile station, as seen at block 515. Until then, the mobile station may continue to uplink data packets, as seen back at block 510.

When the scheduled time for sending a periodic packet uplink acknowledgement has arrived, the algorithm determines the optimum coding scheme that the mobile station should use for data transfers, as seen at block 520. The determination may be made based on the present radio transmission conditions such as block error statistics and the ability of the mobile station to support rapid coding scheme changes. One of several coding schemes that vary in bit transfer rates and bit error susceptibility may be selected. For example, one of four primary coding schemes of GPRS networks may be selected. Mobile units capable of Enhanced Data for Global Evolution (EDGE) may use one of nine additional coding schemes of the newer technology. A throughput degradation parameter, also referred to as a coding performance parameter, may be used to control the frequency of coding scheme changes.

A new coding scheme may or may not be selected, as seen at block 525. When the coding scheme remains unchanged, a packet uplink acknowledgement may be sent to the mobile station containing the current coding scheme command, as seen at block 530. The method then waits again for the time to send an additional packet uplink acknowledgement, as seen back at block 515.

When a new coding scheme is selected, the network sends the mobile station a packet uplink acknowledgement containing a new coding scheme command, as seen at block 535. Subsequently, the network monitors for the new coding scheme to take effect during a reaction time as defined by network specifications and protocols.

The code adaptation method continues by beginning again at block 505 and looping through the steps of blocks 505 through 535 until data packet transfers are complete or the mobile station disconnects from the network.

Figure 6:
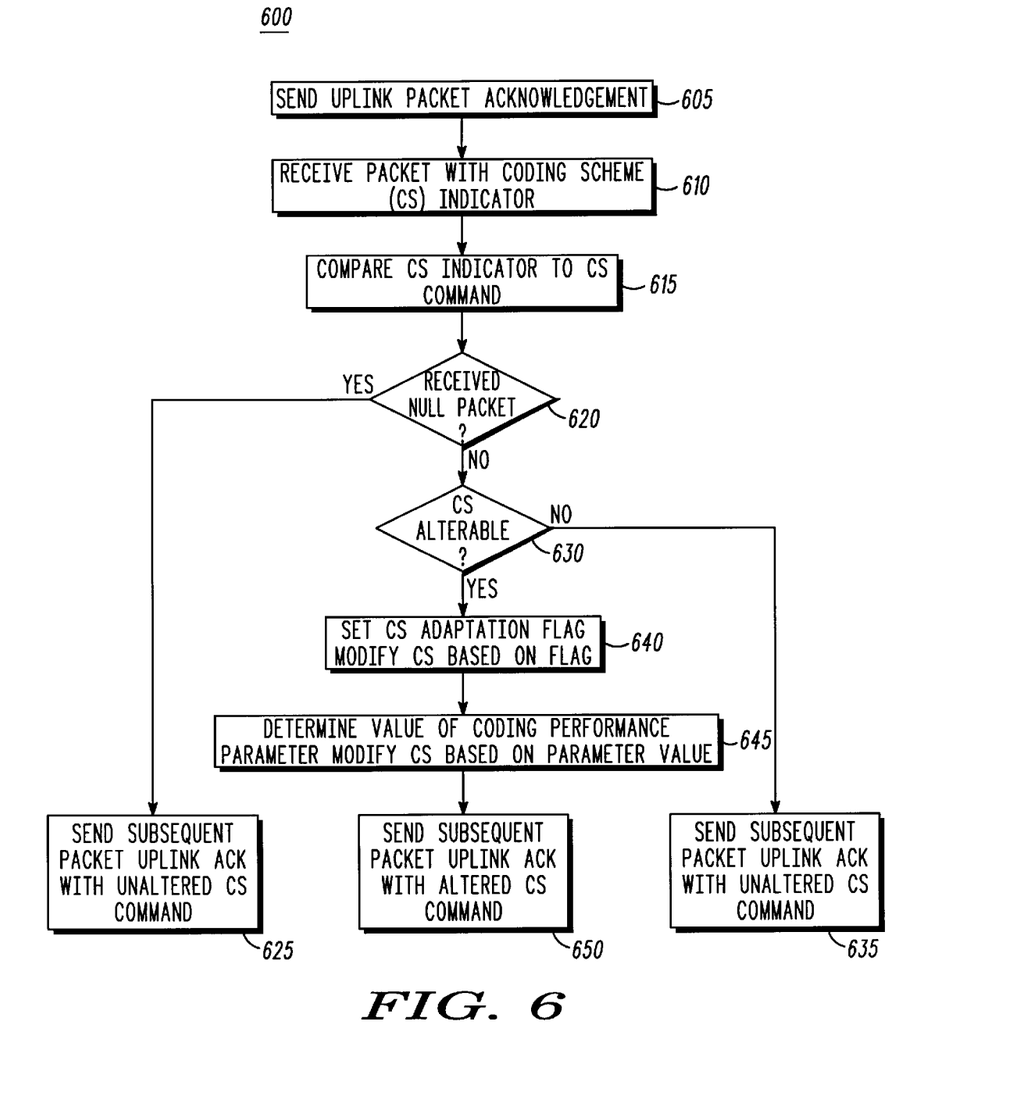
FIG. 6 is a flow chart of another embodiment of a method for determining coding scheme adaptation of a mobile station, in accordance with the current invention.

FIG. 6 is a flow chart of another embodiment of a method for determining coding scheme adaptation of a mobile station, in accordance with the present invention. Code adaptation method 600, which determines the coding scheme adaptation capability of a mobile station, begins with the network or base station sending an uplink packet acknowledgement to the mobile station, as seen at block 605. The uplink packet acknowledgement may contain a coding scheme command indicating a requested coding scheme for the mobile station to use. Alternatively, the coding scheme command may be directed to the mobile unit using any suitable command structure recognized by the mobile station and the wireless protocol, such as with a packet uplink assignment message or a packet power-control timing advance message.

In the process of sending control packets back and forth between the base station and the mobile station, the base station receives one or more packets with a coding scheme indicator from the mobile station, as seen at block 610. The coding scheme indicator may be, for example, a field in a message indicating which coding scheme used with the received data packet.

The network may evaluate one or more indicators, parameters, flags, or previously received data to determine whether the mobile station can support a coding scheme that the network would consider to be optimal, and whether the mobile station can alter its coding scheme at the requested rate or in any other way. Initially, the network may need to compare a coding scheme indicator from the received data packet with the last coding scheme command that it sent to the mobile station, as seen at block 615. The network may determine whether the mobile station has changed its coding scheme to the latest one requested by the network.

The network may monitor the received data packets and determine whether it received a null data packet from the mobile station, as seen at block 620. Some mobile stations may be programmed to send empty, null or dummy data packets when there is no actual data or when the mobile station is unable to comply with the request to change coding schemes. When the network receives one or more null data packets or packet uplink dummy control blocks after sending a packet uplink acknowledgement to the mobile station, it may determine that the mobile station is unable to alter its coding scheme, and may send a subsequent packet uplink acknowledgement including an unaltered coding scheme command, as seen at block 625. Degradation of data throughput is avoided because the network is not attempting to adjust coding schemes when the mobile station is unable to respond accordingly. When it has been determined that the mobile station is not adaptable, a subsequent packet uplink acknowledgement including an unaltered coding scheme command may be sent to the mobile station.

When the network has received a data packet including a coding scheme indicator, it may continue the process of determining whether or not the coding scheme is adaptable, as seen at block 630. When it has been determined that the coding scheme associated with the mobile station is adaptable, the coding scheme may be modified based on the determination. The network may compare the coding scheme indicator of the received data packet to the requested coding scheme contained in the previously sent coding scheme command, and determine that the mobile station is not adaptable when the coding scheme indicator of the received data packet does not match the specified coding scheme. The network may send a subsequent packet uplink acknowledgement including an unaltered coding scheme command when the mobile station is not adaptable, as seen at block 635.

When the coding scheme is adaptable, the network may set a coding scheme adaptation flag associated with the mobile station. The coding scheme may be modified based on the coding scheme adaptation flag, as seen at block 640. When the coding scheme adaptation flag indicates that the mobile station is not adaptable, then the coding scheme command may be sent with the current coding scheme. When the coding scheme adaptation flag indicates that the mobile station is adaptable, then the coding scheme command may be sent with an altered coding scheme, as determined by bit error rates, data packet transfer characteristics, transmission conditions, or the value of a coding performance parameter.

The network may determine the value of the coding performance parameter based on the transfer rates and error rates of received data, and modify the coding scheme based on the value of the coding performance parameter, as seen at block 645. The value of the coding performance parameter might be, for example, a number representing the effectiveness of data packet transfers from the mobile station.

When the mobile station is adaptable and the network has finished evaluating various parameters and criteria that impact the data throughput of the mobile station, the coding scheme may be modified based on the determination. The network sends a subsequent packet uplink acknowledgement including an altered coding scheme command to the mobile station, as seen at block 650.

The sending of subsequent packets uplink acknowledgements and packets with coding scheme indicators may continue back and forth between the mobile station and network, continuing through the steps outlined in blocks 610 through 650 until the mobile station has been disconnected from the wireless network. Other parameters and criteria may be added or changed in the present coding scheme adaptation method without departing from the spirit of the invention.

One or more aspects of the method to determine coding scheme adaptation capability of a mobile station may be coded using any suitable programming language. A program containing the computer program code may be stored on any computer usable medium such as a compact disc (CD), digital versatile disc (DVD), magnetic disc, magnetic tape or any other suitable computer-readable medium.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of determining coding scheme adaptation capability of a mobile station, comprising:

sending a packet uplink acknowledgement to the mobile station;

receiving a data packet including a coding scheme indicator;

determining whether a coding scheme associated with the mobile station is adaptable; and modifying the coding scheme based on the determination; wherein determining whether the coding scheme is adaptable comprises comparing the coding scheme indicator of the received data packet to a coding scheme command.

2. The method of claim 1 wherein determining whether the coding scheme is adaptable comprises determining whether the received data packet is a null data packet.

3. The method of claim 1 wherein modifying the coding scheme based on the determination comprises altering the coding scheme command when the mobile station is adaptable.

4. The method of claim 1 further comprising:

sending a subsequent packet uplink acknowledgement including an altered coding scheme command when the mobile station is adaptable.

5. The method of claim 1 further comprising:

sending a subsequent packet uplink acknowledgement including an unaltered coding scheme command when the mobile station is not adaptable.

6. The method of claim 1 further comprising:

sending a subsequent packet uplink acknowledgement including an unaltered coding scheme command when the received data packet is a null data packet.

7. The method of claim 1 further comprising:

setting a coding scheme adaptation flag associated with the mobile station; and modifying the coding scheme based on the coding scheme adaptation flag.

8. The method of claim 1 further comprising:

determining a value of a coding performance parameter, and modifying the coding scheme based on the value of the coding performance parameter.

9. A computer usable medium including a program to determine coding scheme adaptation capability of a mobile station, comprising:

computer program code to send a packet uplink acknowledgement to the mobile station;

computer program code to receive a data packet including a coding scheme indicator;

computer program code to send a subsequent packet uplink acknowledgement including an unaltered coding scheme command when the received data packet is a null data packet;

computer program code to determine whether a coding scheme associated with the mobile station is adaptable; and computer program code to modify the coding scheme based on the determination.

10. The computer usable medium of claim 9 further comprising:

computer program code to send a subsequent packet uplink acknowledgement including an altered coding scheme command when the mobile station is adaptable.

11. The computer usable medium of claim 9 further comprising:

computer program code to send a subsequent packet uplink acknowledgement including an unaltered coding scheme command when the mobile station is not adaptable.

12. The computer usable medium of claim 9 further comprising;

computer program code to set a coding scheme adaptation flag associated with the mobile station; and computer program code to modify the coding scheme based on the coding scheme adaptation flag.

13. The computer usable medium of claim 9 further comprising:

computer program code to determine a value of a coding performance parameter; and computer program code to modify the coding scheme based on the value of the coding performance parameter.

14. A system for determining coding scheme adaptation capability of a mobile station, comprising:

means for sending a packet uplink acknowledgement to the mobile station;

means for receiving a data packet including a coding scheme indicator;

means for sending a subsequent packet uplink acknowledgement including an unaltered coding scheme command when the received data packet is a null data packet;

means for determining whether a coding scheme associated with the mobile station is adaptable; and means for modifying the coding scheme based on the determination.

15. The system of claim 14 further comprising:

means for sending a subsequent packet uplink acknowledgement including an altered coding scheme command when the mobile station is adaptable.

16. The system of claim 14 further comprising:

means for sending a subsequent packet uplink acknowledgement including an unaltered coding scheme command when the mobile station is not adaptable.

17. The system of claim 16 further comprising:

means for setting a coding scheme adaptation flag associated with the mobile station; and means for modifying the coding scheme based on the coding scheme adaptation flag.

18. The system of claim 14 further comprising:

means for determining a value of a coding performance parameter; and means for modifying the coding scheme based on the value of the coding performance parameter.

19. A method of determining coding scheme adaptation capability of a mobile station, comprising:

sending a packet uplink acknowledgement to the mobile station;

receiving a data packet including a coding scheme indicator;

determining whether a coding scheme associated with the mobile station is adaptable; and modifying the coding scheme based on the determination, wherein determining whether the coding scheme is adaptable comprises determining whether the received data packet is a null data packet.

20. The method of claim 19 wherein determining whether the coding scheme is adaptable comprises comparing the coding scheme indicator of the received data packet to a coding scheme command.

21. The method of claim 19 wherein modifying the coding scheme based on the determination comprises altering the coding scheme command when the mobile station is adaptable.

22. The method of claims further comprising:

sending a subsequent packet uplink acknowledgement including an altered coding scheme command when the mobile station is adaptable.

23. The method of claim 19 further comprising;

sending a subsequent packet uplink acknowledgement including an unaltered coding scheme command when the mobile station is not adaptable.

24. The method of claim 19 further comprising:

sending a subsequent packet uplink acknowledgement including an unaltered coding scheme command when the received data packet is a null data packet.

25. The method of claim 19 further comprising:

setting a coding scheme adaptation flag associated with the mobile station; and modifying the coding scheme based on the coding scheme adaptation flag.

26. The method of claim 19 further comprising:

determining a value of a coding performance parameter; and modifying the coding scheme based on the value of the coding performance parameter.

27. A method of determining coding scheme adaptation capability of a mobile station, comprising:

sending a packet uplink acknowledgement to the mobile station;

receiving a data packet including a coding scheme indicator;

sending a subsequent packet uplink acknowledgement including an unaltered coding scheme command when the received data packet is a null data packet;

determining whether a coding scheme associated with the mobile station is adaptable; and modifying me coding scheme based on the determination.

28. The method of claim 27 wherein determining whether the coding scheme is adaptable comprises comparing the coding scheme indicator of the received data packet to a coding scheme command.

29. The method of claim 27 wherein determining whether the coding scheme is adaptable comprises determining whether the received data packet is a null data packet.

30. The method of claim 27 wherein modifying the coding scheme based on the determination comprises altering the coding scheme command when the mobile station is adaptable.

31. The method of claim 27 further comprising:

sending a subsequent packet uplink acknowledgement including an altered coding scheme command when the mobile station is adaptable.

32. The method of claim 27 further comprising:

sending a subsequent packet uplink acknowledgement including an unaltered coding scheme command when the mobile station is not adaptable.

33. The method of claim 27 further comprising:

setting a coding scheme adaptation flag associated with the mobile station; and modifying the coding scheme based on the coding scheme adaptation flag.

34. The method of claim 27 further comprising determining a value of a coding performance parameter, and modifying the coding scheme based on the value of the coding performance parameter.

* * * * *